United States Patent

Qureshi

[11] Patent Number: 5,929,873
[45] Date of Patent: Jul. 27, 1999

[54] CHART RECORDERS

[75] Inventor: Umar Qureshi, Kingston, United Kingdom

[73] Assignee: ABB Kent-Taylor Limited, Cambridgeshire, United Kingdom

[21] Appl. No.: 08/820,816

[22] Filed: Mar. 19, 1997

[51] Int. Cl.$^6$ .............................. G01D 9/02; G01D 9/32; B41J 2/21

[52] U.S. Cl. .............................. 346/46; 346/49; 346/50; 346/74.4; 346/140.1; 347/2; 347/43

[58] Field of Search .................. 346/46, 49, 50, 346/74.4, 140.1; 347/2, 43

[56] References Cited

U.S. PATENT DOCUMENTS

| | | | |
|---|---|---|---|
| 4,224,628 | 9/1980 | Murray | 347/180 |
| 4,433,338 | 2/1984 | Nakagawa et al. | 347/2 |
| 4,511,907 | 4/1985 | Fukuchi | 347/12 |
| 5,220,342 | 6/1993 | Moriyama | 347/43 |
| 5,270,732 | 12/1993 | Kalteis et al. | 347/46 |

FOREIGN PATENT DOCUMENTS

| | | |
|---|---|---|
| 0595650 | 4/1994 | European Pat. Off. . |
| 2752471 | 5/1979 | Germany . |

*Primary Examiner*—N. Le
*Assistant Examiner*—Lamson D. Nguyen
*Attorney, Agent, or Firm*—Hodgson, Russ, Andrews, Woods & Goodyear LLP

[57] ABSTRACT

A chart recorder method and apparatus wherein a recording head records a plurality of different colored line segments on a recording medium, a head drive moves the recording head and the recording medium reciprocally relative to each other in a scanning direction, a recording medium drive moves the recording medium and the recording head relative to each other in a sub-scanning direction, a component receives a plurality of signals to be recorded on the recording medium as a corresponding plurality of traces to be recorded by the recording head, and a control circuit controls the recording head so that at least one of the traces is formed by line segments which change color cyclically.

7 Claims, 3 Drawing Sheets

CHART RECORDERS

BACKGROUND OF THE INVENTION

This invention relates to chart recorders and to their methods of operation.

A simple form of known chart recorder has a pen which is positioned in one direction in dependence upon the level of an input signal, as a sheet of paper is moved beneath the pen in an orthogonal direction, for example at a constant speed, so that the pen produces a trace on the paper. It is also known, if more than one trace is to be recorded at a time, to provide a corresponding number of pens, and in order to aid distinction of the traces from each other the pens may have different coloured inks. However, a problem with multi-colour pen chart recorders is that the pens cannot cross each other's paths unless they are arranged to draw on the sheet at different positions in the feed direction of the sheet, and thus the traces at a particular position in the feed direction are not contemporaneous unless delays are built into the driving of the pens in accordance with their relative positions in the paper feed direction.

With the advent of piezo printing technology, it is also known to provide a chart recorder with a single multi-colour dot-printing head (for example having six in-line pens for inks of six different colours) which is reciprocated in a scanning direction, while the recording paper is moved in an orthogonal sub-scanning direction, for example at a constant speed. With this example, six effectively continuous traces can be produced in the six different colours, by causing each pen to dot its particular coloured ink at a point during the scanning stroke of the head dependent upon the level of the respective input signal which is to be traced. In this example, if more than six channels are to be recorded at the same time, then one option is to use a head with more colours, but this adds to the expense of manufacture and maintenance. Another option is to use the same colour for more than one trace, and then perhaps to add labels to the chart to help distinguish between the traces in the same colour, but this is still likely to lead to confusion. A further option is to use ink-jet technology to form each dot as an array of pixels of different colours which are not readily distinguishable from each other by the naked eye. It is known to produce up to twenty-four different traces from four basic colours by such a dot pixel technique. However, with that many different traces it is not easy to distinguish some of the different-coloured traces from each other. Furthermore, a high resolution ink-jet head and high speed driving circuitry are required, resulting in high manufacturing cost. The present invention is concerned with these problems.

SUMMARY OF THE INVENTION

In accordance with a first aspect of the invention there is provided a method of operating a chart-recorder which records a plurality of visually-differentiated traces on a recording medium comprising forming at least one said trace in successive cyclically repeating line segments of at least two visually-distinguishable types.

In this specification, the term "line segment" is intended to cover a single mark, such as a dot produced by the recorder, and also a group of elementary marks arranged in a line or block. However, in the invention each line segment is visually distinct and may, for example, be at least 1 mm long, more preferably at least 2 to 4 mm long, and even more preferably about 10 mm long. Preferably, each line segment is substantially longer than it is wide.

In one example of the method, one of said types of segment may be constituted by spaces between the other type or types of segment. Alternatively the at least two types of segment may be of different shapes. It is preferred however that the trace (line) segments are of different colours. Accordingly, using two colours, say red and blue, it is possible to produce three visually distinguishable traces: red; blue; and alternating red and blue. Using six colours, and no more than two colours per trace, up to twenty-one different traces may be possible. It will be appreciated that more than two colours may be used in a single trace. Furthermore, different lengths of segments may be formed, so that, for example, blue and red can be combined to form one trace with long red segments and short blue segments, and another trace with long blue segments and short red segments.

In accordance with a second aspect of the invention, there is provided a chart recorder having means to cause the recorder to operate in accordance with the method described above, as defined in some of the appended claims.

In accordance with a third aspect of the present invention, there is provided a chart recorder comprising: a recording head operable to record a plurality of different coloured line segments on a recording medium; a head drive for moving the recording head and the recording medium reciprocally relative to each other in a scanning direction; a recording medium drive for moving the recording medium and the recording head relative to each other in a sub-scanning direction; and means for receiving a plurality of signals to be recorded on the recording medium as a corresponding plurality of traces recorded by the recording head; characterised by a control circuit operable to control the recording head so that at least one of the traces is formed by line segments which change colour cyclically.

In the case where the recording head records the different colours from different positions on the recording head spaced apart in the scanning direction, the control circuit is preferably operable, upon a change between two colours in the formation of said one trace, to take into account the spacing between the positions on the recording head from which those two colours are recorded.

In one embodiment, the recording head is conveniently in the form of a multi-colour ink-jet recording head.

Specific embodiments of the invention will now be described by way of example with reference to the accompanying drawings, in which:

DETAILED DESCRIPTION OF THE INVENTION

Figure 2:
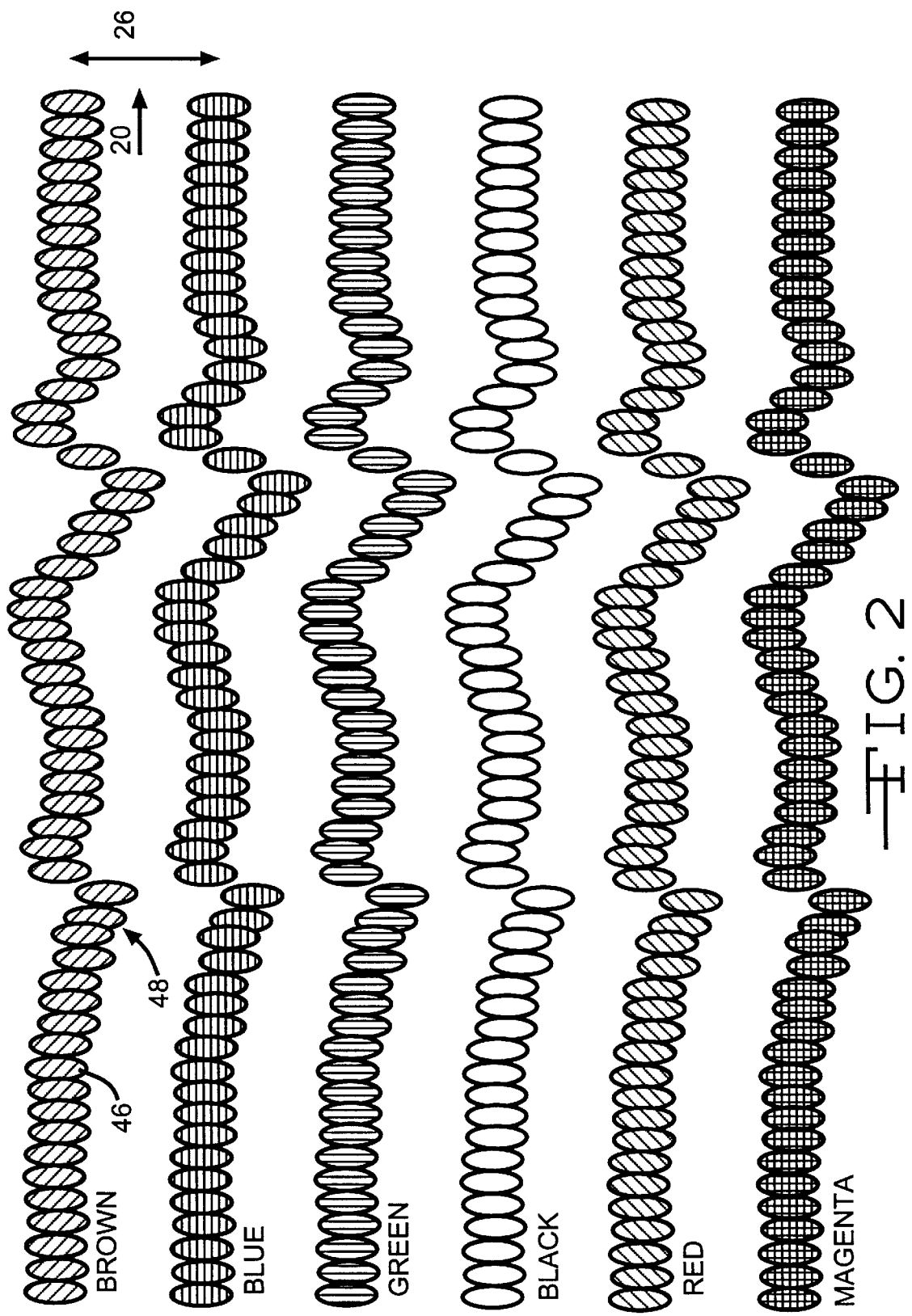
FIG. 2. illustrates examples of conventional traces which can be produced by the recorder of FIG. 1.
Figure 3:
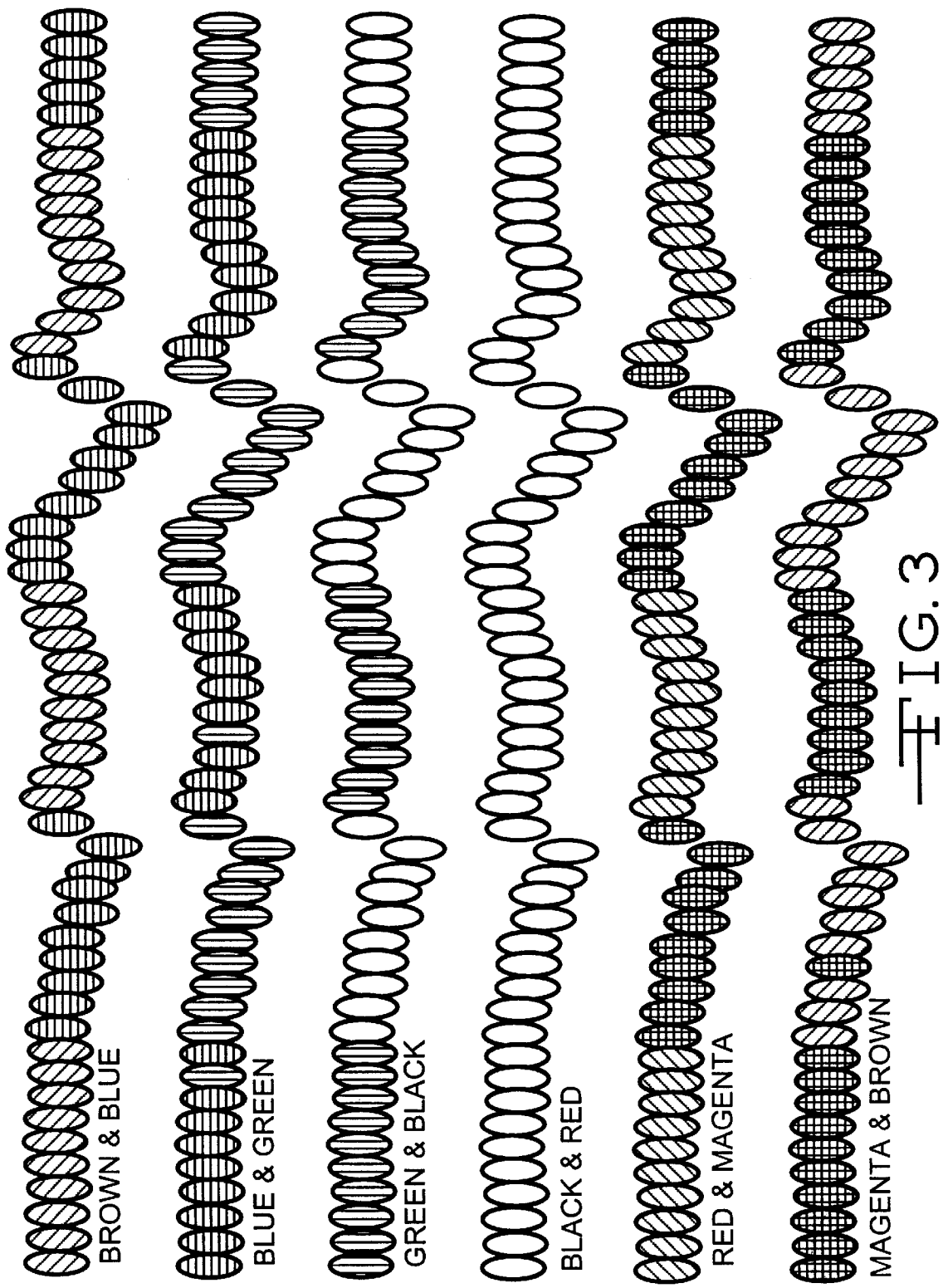
FIG. 3 illustrates examples of traces which can be produced by the recorder of FIG. 1 when employing the invention.

Because FIGS. 2 and 3 are black-on-white drawings representing coloured traces, hatching has been used to represent the colours as follows: Brown—diagonal hatching //; Blue—vertical hatching; Green—horizontal hatching; Black—filled in; Red—diagonal hatching \\; Magenta—vertical and horizontal cross-hatching.

Figure 1:
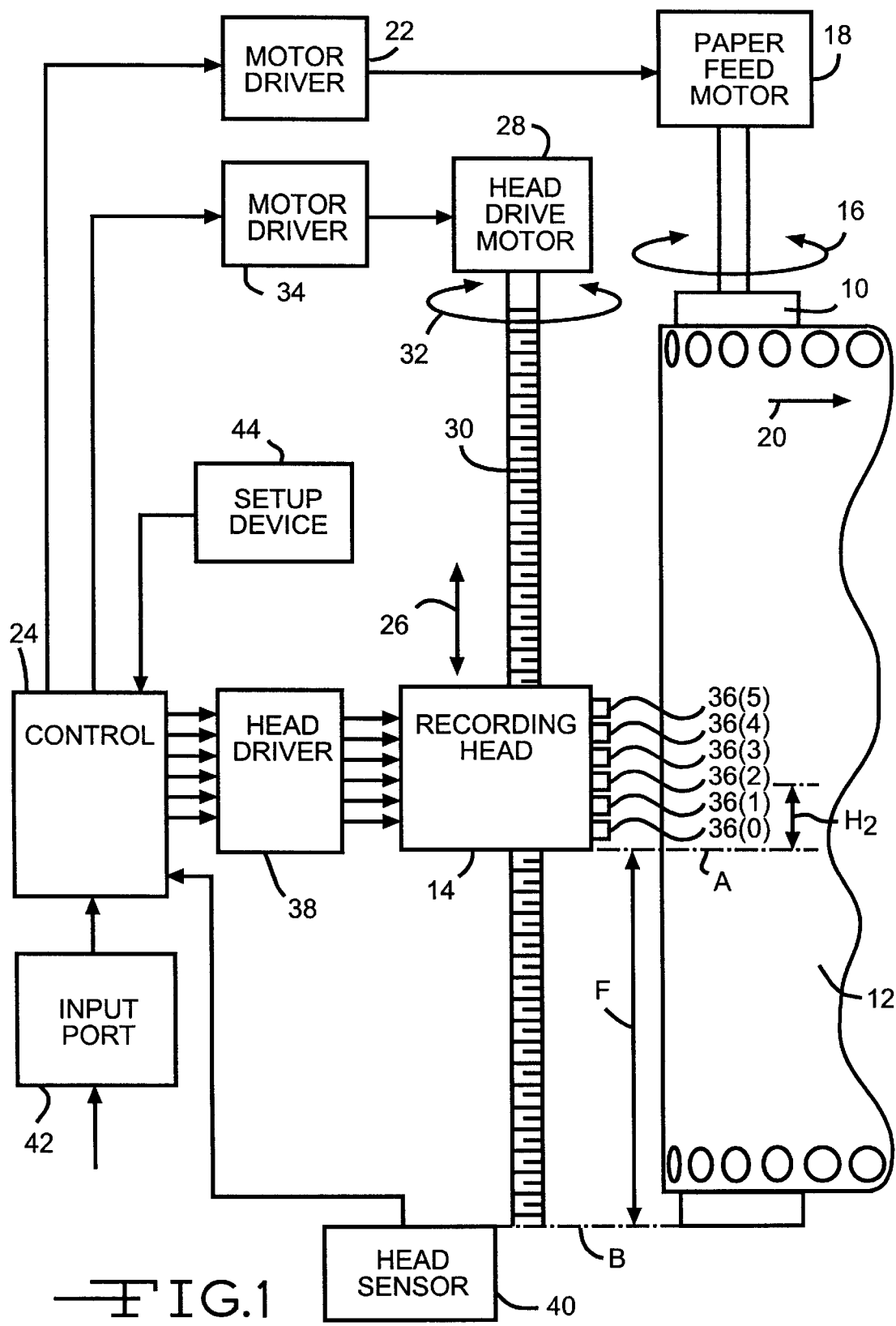
FIG. 1 is a block diagram showing one embodiment of colour chart recorder in accordance with the invention.

Referring to FIG. 1, the chart recorder has a platen roller 10 for conveying continuous chart paper 12 with perforated edges past a recording head 14. The roller 10 is driven for rotation in the direction of the arrow 16 by an electric-feed motor 18 so that the paper advances in the direction of the arrow 20. The paper-feed motor 18, which may be a stepper motor or some other form of motor with a rotary encoder in a feedback loop, is driven by a motor driver circuit 22, which is in turn controlled by a control circuit 24. The control circuit 24 may take the form of a microcomputer or a dedicated hard-wired circuit. The recording head 14 is driven for reciprocating movement in the direction of the arrows 26 parallel to the axis of the platen roller 10 by a reversible electric head-drive motor 28. The head-drive motor 28 is coupled to the recording head 14 by a lead screw 30 which rotates in the direction of the arrows 32, or by other suitable means such a drive belt or cable. The head-drive motor 28, which may be a stepper motor, is driven by a motor driver circuit 34, which is in turn controlled by a control circuit 24. The recording head 14 is of the piezo-electric or electrothermal ink-jet type and has six nozzles 36(0) to 36(5) which can apply ink in the colours brown, blue, green, black, red and magenta, respectively, or in any other chosen colours. The piezoelectric or electrothermal elements in the recording head 14 are driven by a head driver circuit 38, which is in turn controlled by the control circuit 24. The recorder also includes a head position sensor 40 which signals to the control circuit 24 when a reference point A on the recording head 14 is at a predetermined position B in the direction of the arrows 26, for example near to one end of its travel along the lead screw 30, so that the control circuit 24 can check a datum position of the recording head 14. The control circuit 24 receives input signals for the traces to be recorded via an input port 42. A setup device 44 is provided, in the form of a keyboard, keypad or a bank of switches and potentiometers. The setup device 44 is used to set the origin position in millimetres in the direction 26 across the paper for trace to be recorded, the scale of deflection in mm per signal unit for each trace and the colouring to be used for each trace. The control circuit 24, input port 42 and setup device 44 may be dedicated parts of the chart recorder, or they may be provided separately, for example by a PC connected to the charter recorder by a serial or parallel link.

In operation of the chart recorder, the recording head 14 is reciprocated in the direction 26 by the head-drive motor 28. At the end of each stroke of the recording head 14, the paper is advanced, by for example 0.4 mm, in the direction 20 by the paper feed motor 18. During each stroke, the nozzles 36 for the different coloured inks are operated as appropriate to form dots 46 of ink on the paper 12, as shown in FIG. 2, and over time the dots form traces 48 on the paper 12.

In a simple conventional form of the recorder described above, there are up to six input channels, and a different coloured trace is assigned to each input channel. If a trace to be recorded has an origin position of C mm from the datum position B, a scale of deflection from the origin position of D mm/signal unit and is to be recorded using one of the nozzles 36(E) (where E is from 0 to 5), then during a stroke of the recording head 14, that nozzle 36(E) is caused to place a droplet of ink when the distance F between the reference point A on the recording head 14 and the datum position B is:

$$F = C + D.G - H_E \qquad \text{(Formula 1)}$$

where:
G is the current value of the signal to be traced in signal units, and $H_E$ is the distance between the reference point A on the head 14 and the position of the nozzle 36(E), as shown in FIG. 1 as $H_2$ for the nozzle 36(2).

For example, if a green trace is to be recorded with an origin position of C=120 mm and with a scale of deflection of D=3 mm/signal unit, and if the distance $H_2$ between the reference point R and the green nozzle 36(2) is 5.4 mm, then for an input signal G of, say, 11.7 signal units, the control circuit 24 causes the nozzle 36(2) to place a droplet of ink when the distance F between the reference point A on the recording head 14 and the datum position B is: F=120+3×11.7−5.4=149.7 mm.

In the case where the recording head 14 is used for bi-directional printing, there may be an offset of the dots in dependence upon the direction of travel of the recording head 14. Accordingly, the amount of the offset and the direction of travel may be taken into account in determining when to trigger the nozzles.

In order to provide the benefits of the present invention, the recorder described above may be modified as follows. Instead of accepting six input channels, the input port 42 and control circuit 24 accept, for example, twelve channels. Six of those channels are treated in the manner described above to produce traces in the colours brown, blue, green, black, red and magenta, as shown in FIG. 2. The other six channels, however, produce traces each made up of a series of segments of two alternating colours, such as brown and blue, blue and green, green and black, black and red, red and magenta, and magenta and brown, as shown in FIG. 3. For these channels, the change from one colour to the other may be made after a predetermined number of strokes of the recording head, for example after each ten strokes as shown in FIG. 3, so that if the paper advance between each stroke is 0.4 mm as mentioned above, then the length of each coloured segment in the direction 20 will be 4 mm. If the paper is not advanced at a steady rate, then, as an alternative to changing colour after a predetermined number of strokes, the colour changes may be made after predetermined intervals of time.

It should be noted that, for the two-colour traces, in addition to changing the nozzle 36 which is used after every ten strokes the recording head 14, it is also necessary to change the value of $H_E$ (the distance between the reference point A on the head 14 and the position of the nozzle 36(E), because this value is specific to the nozzle being used and not to the trace. As an example, in the case of a green and black trace, if the distance $H_2$ for the green nozzle 36(2) is 5.4 mm as mentioned above, and if the distance $H_3$ for the black nozzle 36(3) is 7.55 mm, then the control circuit 24 operates on the basis of a modification to Formula 1 set out above so that, for example:

F=C+D.G−5.4 mm using green nozzle 36(2) for even tens of strokes; and

F=C+D.G−7.55 mm using the black nozzle 36(3) for odd tens of strokes.

It should also be noted that using single and dual colour traces with a six nozzle head, it is possible to create more than twelve different traces, indeed twenty one different traces are possible. More generally, for n nozzles producing single and dual colour traces, the number of different traces possible is ½n(n+1). However, depending on the colours, some combinations may not be sufficiently visually distinct from other combinations. An even wider range of visually distinct variations is possible if the coloured segments are of unequal length.

It should furthermore be noted that more than two colours may be used for a trace in order to increase the number of different traces possible.

The invention may also be applied to a single-colour chart recorder, for example an ink-jet recorder which records with black ink, or a thermal recorder which records on heat-sensitive paper. In order to produce a plurality of visually distinct traces, the recording of one or more of the traces may be interrupted in a regular predetermined manner dependent on the advance of the paper or time. This type of trace is only suitable when the discontinuities are not such as to introduce ambiguities into the recording. This disadvantage can be reduced if instead the successive segments are made of different shapes eg. dashes and crosses, or are printed with a different colour density eg. so that the segments are alternately grey and black.

It will be appreciated that the above description of embodiments of the invention is given merely by way of example and that many modifications and developments may be made in keeping with the invention.

Each feature disclosed in this specification (which term includes the claims) and/or shown in the drawings may be incorporated in the invention independently of other disclosed and/or illustrated features.

In summary, a chart recorder produces traces made up of cyclically repeating visually distinguishable segments, for example of different colours. The number of differentiated traces which can be produced is thereby increased.

I claim:

1. A chart recorder comprising:
   a recording head to record a plurality of different colored line segments on a recording medium;
   a head drive for moving the recording head and the recording medium reciprocally relative to each other in a scanning direction;
   a recording medium drive for moving the recording medium and the recording head relative to each other in a sub-scanning direction; and
   means for receiving a plurality of signals to be recorded on the recording medium as a corresponding plurality of traces to be recorded by the recording head; characterised by:
   a control circuit to control the recording head so that at least one of the traces is formed by line segments which change color cyclically.

2. A recorder as claimed in claim 1, wherein the recording head records the different colors from different elements on the recording head in spaced relation in the scanning direction, and wherein, upon a change between two colors in the formation of said one trace, the control circuit operates to control the recording head in accordance with the spacing between the elements on the recording head from which those two colors are recorded.

3. A recorder as claimed in claim 1, wherein the recording head is a multi-color ink-jet recording head.

4. A chart recorder comprising; means for recording a plurality of visually-differentiated traces on a recording medium; and control means for causing at least one of the traces to be formed by the recording means in successive cyclically repeating line segments of at least two visually-distinguishable types.

5. A recorder as claimed in claim 4, wherein the control means operates such that one of said types of segment is constituted by spaces between the other type or types of segment.

6. A recorder as claimed in claim 4, wherein the recording means operates to record line segments of a plurality of different colors and wherein the control means operates to cause the recording means to record the at least two types of line segment in different colors.

7. A recorder as claimed in claim 4, and wherein the control means operates to cause the recording means to record the at least two types of line segments in different shapes.

* * * * *